(12) United States Patent
Cai et al.

(10) Patent No.: US 9,245,355 B2
(45) Date of Patent: Jan. 26, 2016

(54) METHOD FOR ENCODING/DECODING A 3D MESH MODEL THAT COMPRISES ONE OR MORE COMPONENTS

(75) Inventors: Kang Ying Cai, Beijing (CN); Qu Qing Chen, Beijing (CN); Jun Teng, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 477 days.

(21) Appl. No.: 13/376,604

(22) PCT Filed: Jun. 9, 2010

(86) PCT No.: PCT/EP2010/058111
§ 371 (c)(1),
(2), (4) Date: Dec. 7, 2011

(87) PCT Pub. No.: WO2010/142743
PCT Pub. Date: Dec. 16, 2010

(65) Prior Publication Data
US 2012/0075302 A1    Mar. 29, 2012

(30) Foreign Application Priority Data
Jun. 10, 2009 (EP) .................................... 09305527

(51) Int. Cl.
*G06T 19/00* (2011.01)
*G06T 9/00* (2006.01)

(52) U.S. Cl.
CPC ................. *G06T 9/001* (2013.01); *G06T 9/004* (2013.01)

(58) Field of Classification Search
CPC ......... G06T 17/00; G06T 19/20; G06T 13/00; G06T 13/202; G06T 17/20; G06T 19/00

USPC .................................................. 345/419, 420
See application file for complete search history.

(56) References Cited

U.S. PATENT DOCUMENTS 5,734,385 A    3/1998    Mima et al.
5,793,371 A    8/1998    Dearing
(Continued)

FOREIGN PATENT DOCUMENTS

CN    1250289 A    4/2000
CN    101408990    4/2009
(Continued)

OTHER PUBLICATIONS

R. Amjoun etal: "Compression of Complex Animated Meshes", Advances in Computer Graphics Lecture Notes in Computer Science, vol. 4035, Jan. 1, 2006,pp. 606-613.
(Continued)

*Primary Examiner* — Kimbinh T Nguyen
(74) *Attorney, Agent, or Firm* — Tutunjian & Bitetto, P.C.

(57) ABSTRACT

3D mesh models are represented by three types of data: connectivity data, geometry data and property data. The surface of a 3D object is a triangle mesh. 3D meshes contain huge amounts of data that need to be compressed efficiently. Additionally to the common world coordinate system for the complete model and local coordinate system for a single triangle, an individual component coordinate system for each connected component is used. The component coordinate system is used to normalize the orientation of the respective component for quantization and de-quantization. This improves the accuracy of encoded 3D mesh models after quantization/de-quantization, particularly if a 3D mesh model comprises one or more distinct components.

14 Claims, 4 Drawing Sheets

(56) References Cited

U.S. PATENT DOCUMENTS

| | | | |
|---|---|---|---|
| 6,167,159 A | 12/2000 | Touma et al. | |
| 6,192,150 B1 | 2/2001 | Leow et al. | |
| 6,546,141 B1 | 4/2003 | Jung et al. | |
| 6,563,500 B1 | 5/2003 | Kim et al. | |
| 6,573,890 B1* | 6/2003 | Lengyel | 345/419 |
| 6,577,310 B1 | 6/2003 | Kim et al. | |
| 6,606,095 B1* | 8/2003 | Lengyel et al. | 345/473 |
| 6,614,428 B1* | 9/2003 | Lengyel | 345/420 |
| 6,668,091 B1 | 12/2003 | Kim et al. | |
| 6,898,320 B2 | 5/2005 | Han et al. | |
| 6,906,714 B2* | 6/2005 | Grzeszczuk et al. | 345/420 |
| 6,919,889 B2* | 7/2005 | Grzeszczuk et al. | 345/420 |
| 6,975,755 B1 | 12/2005 | Baumberg et al. | |
| 7,265,752 B2 | 9/2007 | Sander et al. | |
| 8,000,540 B2 | 8/2011 | Ahn et al. | |
| 8,254,705 B2 | 8/2012 | Ahn et al. | |
| 2003/0044073 A1 | 3/2003 | Matsugu et al. | |
| 2003/0086617 A1 | 5/2003 | Huang | |
| 2003/0117392 A1 | 6/2003 | Harvill | |
| 2003/0234783 A1 | 12/2003 | Grzeszczuk et al. | |
| 2004/0085312 A1 | 5/2004 | Buchner et al. | |
| 2006/0008151 A1 | 1/2006 | Lin et al. | |
| 2007/0109298 A1 | 5/2007 | Elmieh et al. | |
| 2007/0286468 A1 | 12/2007 | Joshi et al. | |
| 2008/0205749 A1 | 8/2008 | Beaulieu et al. | |
| 2009/0074272 A1 | 3/2009 | Lu et al. | |
| 2009/0080747 A1 | 3/2009 | Lu et al. | |
| 2009/0184956 A1 | 7/2009 | Kim et al. | |
| 2010/0111370 A1* | 5/2010 | Black et al. | 382/111 |

FOREIGN PATENT DOCUMENTS

| | | |
|---|---|---|
| EP | 0448802 | 10/1991 |
| EP | 0757332 | 11/2002 |
| EP | 1232480 | 5/2006 |
| FR | 2786588 | 2/2005 |
| GB | 2355089 | 11/2003 |
| JP | H08221594 | 8/1996 |
| JP | H09171568 | 6/1997 |
| JP | 2000175190 | 6/2000 |
| JP | 2001022956 | 1/2001 |
| JP | 2005084780 | 3/2005 |
| JP | 2006136020 | 5/2006 |
| WO | WO9934336 | 7/1999 |
| WO | WO0139124 | 5/2001 |
| WO | WO2006064478 | 6/2006 |
| WO | WO2009108135 | 9/2009 |

OTHER PUBLICATIONS

D.V. Vranic etal: "3D Model Retrieval", Proceedings of the Spring Conference on Computer Graphics and its Applications, May 3, 2009,pp. 89-93.

R. Amjoun etal: "Encoding Animated Meshes in Local Coordinates" Int'l Conference on IEEE, Oct. 24, 2007, pp. 437-446.

D. Shikhare etal: "Compression of Large 3D engineering models using automatic discovery of repeating geometric features" Vision, Modeling and Visualization 2001, pp. 233-240.

M. Sattler etal: "Simple and efficient compression of animation sequences" Proceedings of the 2005 ACM, Jul. 29-Jul. 31, 2005, pp. 209-217.

Search Report dated Dec. 9, 2010.

Peng et al., "Technologies for 3D mesh compression : A survey", Elsevier Journal of Visual Communication and Image Representation, 16(6), 688-733, 2005.

Gieng et al., "Smooth hierarchical surface triangulations", Proceedings. Visualization '97 (Cat. No. 97CB36155), 379-386. IEEE, New York, NY, USA, 1997.

Ouyang et al., "On the normal vector estimation for point cloud data from smooth surfaces", Computer aided design, vol. 37, No. 10, Sep. 1, 2005, pp. 1071-1079.

Chou et al., "Vertex Data Compression through Vector Quantization", IEEE Transactions on Visualization and Computer Graphics, vol. 8, No. 4, Oct.-Dec. 2002, pp. 373-382.

Gumhold et al., "Higher order prediction of geometry compression", Proceedings of the Shape Modeling International, Seoul, Korea, May 12, 2003, pp. 59-66.

Lee et al., "Angle-analyzer: A triangle-quad mesh codec", Eurographics' 02 Conference Proceedings, vol. 21, No. 3 (2002), pp. 383-392.

Lee et al., "Vertex data compression for traingular meshes", In Proceedings of Computer Graphics and Applications, Hong Kong, Oct. 3, 2000, pp. 225-234.

Martin et al., "Range encoding: an algorithm for removing redundancy from digitized message", Video & Data Recording Conference, Southampton, United Kingdom, Jul. 24, 1979, pp. 1-11.

Deering, "Geometry Compression", Proceedings of ACM SIGGRAPH, 1995, pp. 13-20.

Kim et al., "Normal Compression Based on Clustering and Relative Indexing", 10th Pacific Conference on Computer Graphics and Applications, Oct. 9, 2002, Tsinghua University, Beijing, China, pp. 1-2.

Kim et al., "Normal Vector Compression of 3D Mesh Models based on Clustering and relative indexing", Future Generation Computer Systems, vol. 20, 2004, pp. 1241-1250.

Kim et al., "The Compression of the Normal Vectors of 3D Mesh Models Using Clustering", ICCS 2002, LNCS 2330, 2002, pp. 275-284.

Cai et al., "Exploiting Repeated Patterns for Efficient Compression of Massive Models", VRCAI 2009, Yokohama, Japan, Dec. 14, 2009, pp. 145-150.

Mudur et al., "3D Compression of Engineering Models for Cooperative Computing Applications", International Conference on Infrastructure for E-Business, Jan. 21, 2002, pp. 1-10.

Rungta et al., "Domain Based Lossless Text Compression—Report", FIT 2044 Advanced Project, Semester 2, 2007, pp. 1-10.

Cai et al., "A Single-Pass Approach to Adaptive Simplification of Out-of-Core models", International Journal of Image and Graphics, vol. 3, No. 2, Mar. 2003, pp. 1-19.

Devillers et al., "Geometric Compression for Interactive Transmission", Proceedings of Visualization 2000, Oct. 13, 2000, Salt Lake City, Utah, USA, pp. 319-326.

Garland et al., "Simplifying Surfaces with Color and Texture using Quadric Error Metrics", Proceedings of Visualization 1998, Oct. 24, 1998, Research Triangle Park, North Carolina, USA, pp. 263-269.

Rossignac, "Edgebreaker: Connectivity Compression for Triangle Meshes", IEEE Transactions on Visualization and Computer Graphics, vol. 5, No. 1, Jan.-Mar. 1999, pp. 47-61.

MacQueen, "Some Methods for Classification and Analysis of Multivariate Observations", Proceedings of 5th Symposium on Mathematical Statistics and Probability, Jun. 21, 1965, Berkeley, California, USA, pp. 281-297.

\* cited by examiner

Fig.6 ns resolutions for different regions. Within each region, the vertex coordinates are uniformly quantized. Compared with non-uniform quantization, uniform quantization is simple and computationally efficient, but it is not optimal in terms of rate-distortion (R-D) performance.

Figure 1:
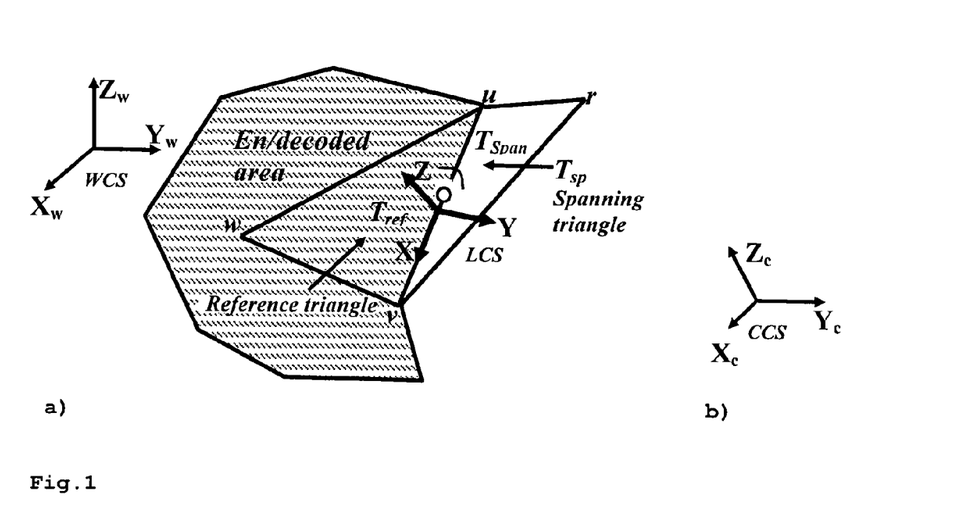

Another important issue of geometry data compression is the coordinate system used to express vertex positions. Commonly a (usually cartesian) world coordinate system (WCS) for the complete model and/or a local coordinate system (LCS) for a single triangle are used, as shown in FIG. 1 a).

METHOD FOR ENCODING/DECODING A 3D MESH MODEL THAT COMPRISES ONE OR MORE COMPONENTS

This application claims the benefit, under 35 U.S.C. §365 of International Application PCT/EP2010/058111, filed Jun. 9, 2010, which was published in accordance with PCT Article 21(2) on Dec. 16, 2010 in English and which claims the benefit of European patent application No. 09305527.5, filed Jun. 10, 2009.

FIELD OF THE INVENTION

This invention relates to encoding and decoding of 3D mesh models that comprise one or more components, corresponding encoders and decoders, and resulting data sets.

BACKGROUND

Three-dimensional (3D) meshes have been widely used in various applications for representing 3D objects. Their raw representation usually requires a huge amount of data, especially with the rapid growth of 3D scanners. However, most applications demand compact representation of 3D meshes for storage and transmission. Various algorithms have been proposed to compress 3D meshes efficiently from the early 1990s. Assumingly, this kind of technique will receive even more attention from both academe and industry with the rapid growth of internet based 3D applications.

The surface of a 3D object is a triangle mesh, i.e. it is composed of triangles. Two triangles that share an edge are neighbours. A sequence of neighbouring triangles is a path, and a set of triangles is called a connected component if a path between any two of its triangles exists. Flat surface areas that are in the shape of a parallelogram require only two triangles to be correctly described, while flat areas that are not in the shape of a parallelogram require more triangles. Typically, 3D meshes are represented by three types of data: connectivity data, geometry data and property data. Connectivity data describe the adjacency relationship between vertices, geometry data specify vertex locations in 3D space, and property data specify attributes such as the normal vector, material reflectance and texture coordinates. Most widely-used 3D compression algorithms compress connectivity data and geometry data separately. The coding order of geometry data is determined by the underlying connectivity coding. 3D mesh property data are usually compressed by a method similar to geometry compression.

Geometry data are usually compressed by exploiting high correlation between the positions of adjacent vertices along the coding order, which are also spatially adjacent in most cases. Most geometry compression schemes follow a three-step procedure: pre-quantization of vertex positions, prediction of quantized positions, and entropy coding of prediction residuals.

Uncompressed geometry data typically specify each coordinate component with a 32-bit floating-point number. However, this precision is beyond human eyes' perception capability and is far more than needed for common applications. Thus, quantization can be used for reducing the data amount without serious impairment on visual quality. Quantization techniques can be classified to be uniform on non-uniform. Each quantization cell is of the same length in a uniform scalar quantizer while cells have different lengths in a non-uniform scalar quantizer. A known method is to partition a mesh into several regions according to local curvature and triangle sizes, and then adaptively choose different quantiza-

SUMMARY OF THE INVENTION

The present invention provides methods and means for improving the accuracy of encoded 3D mesh models, and particularly the accuracy of encoded 3D mesh models that comprise one or more distinct components.

A method for encoding a 3D mesh model that is composed of one or more components is disclosed in claim 1.

A corresponding encoded 3D mesh model that is composed of one or more components is disclosed in claim 12.

A method for decoding an encoded 3D mesh model that is composed of one or more components is disclosed in claim 6.

A geometry encoder for encoding a 3D mesh model that is composed of one or more components is disclosed in claim 10.

A geometry decoder for decoding an encoded 3D mesh model that is composed of one or more components is disclosed in claim 11.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a) the world coordinate system and a local coordinate system for usage with a 3D mesh model;

FIG. 1 b) a component coordinate system for usage with a component of a 3D mesh model;

FIG. 3 a)-c) details of an uncompressed 3D mesh model;

FIG. 3 d)-f) details of a conventionally quantized and de-quantized 3D mesh model with artifacts;

FIG. 3 g)-i) details of an improved quantized and de-quantized 3D mesh model according to the invention;

DETAILED DESCRIPTION OF THE INVENTION

FIG. 1 shows a portion of a 3D mesh model with respective cartesian coordinate systems. The world coordinate system WCS with its three orthonormal axes $X_w, Y_w, Z_w$ is valid for the whole model. A spanning triangle $T_{sp}$ (uvr) is described relative to a reference triangle $T_{ref}$(uvw). A local coordinate system LCS (with three orthonormal axes X,Y,Z) is usually defined at each reference triangle. The common side $\vec{uv}$ of $T_{ref}$ and $T_{sp}$, which is called "active gate", defines the local x-axis X. The middle point O of $\vec{uv}$ is assumed to be the origin. The local z-axis Z is the normal of the reference triangle $T_{ref}$. The local y-axis Y is then obtained by computing the cross product of the local z and x axes, and is therefore orthogonal to the xz plane. The local coordinate system LCS needs to be re-calculated for each current front vertex (r in FIG. 1). Since the range of the local coordinate values is not predefined, quantization in the local coordinate system is a two-pass process. One initial pass is necessary to find the range of local coordinates. Compared with quantization in the world coordinate system WCS, quantization in local coordinate system LCS is more complex and needs much more computational effort.

When compressing a 3D model (i.e. vertices and connection data), quantization is used, resulting in quantization errors. Quantization is a lossy procedure, since it represents a large or infinite set of values with a smaller set. Typical mesh geometry coding schemes uniformly quantize each coordinate at 8-bit to 12-bit quantization resolutions. For models with smooth surface and uniformly distributed vertices, the quality loss can hardly be noticed for human eyes. However, this approximation often fails to accurately reproduce flat surfaces that are not orthogonal to any coordinate axes, adding an important amount of distortion even for a simple geometry. E.g. if a model comprises a large flat area, the quantization error may conventionally have the effect that the triangles that belong to an originally flat partial area are not flat any longer, i.e. they do not make a flat surface after de-quantization. It has been found that this problem results partly from the position of the component, relative to the world coordinate system WCS. The present invention solves this problem by defining a separate component coordinate system CCS for each component.

According to one aspect of the invention, a 3D mesh model that is de-composed into components can be quantized better and more accurately when each component is encoded relative to its own individual component coordinate system CCS, as shown in FIG. 1 b). In the encoder, the component coordinate system CCS is used to normalize the component for quantization, so that the quantization is done in the world coordinate system WCS. This reduces quantization errors. In the encoded 3D model, data defining the component coordinate system CCS are included. In the decoder, the data defining the component coordinate system CCS are extracted, the component is de-quantized in the world coordinate system WCS and then transformed back into its original position, using the extracted component coordinate system CCS.

In the following, the encoding and decoding processes are explained in more detail. Generally, the vertex positions of a current component are $\{v_i|i=0, \ldots, n\}$. Suppose a current connected component has m triangles. For any triangle $T_i$ of the current connected component, we denote its area as $S_i$ and its three vertices of as $v_{i0}$, $v_{i1}$ and $v_{i2}$. The triangles of the current component are $\{(i0,i1,i2)|i=0, \ldots, m\}$. The complete surface area of the current component is S.

In one embodiment, the following steps are performed during encoding:
1. Calculate the mean point of the component $v_{mean}$ and the covariance matrix C as follows.

$$S = \sum_{i=1}^{m} S_i \quad (1)$$

$$v_{mean} = \frac{1}{3mS} \sum_{i=1}^{m} S_i(v_{i0} + v_{i1} + v_{i2}) \quad (2)$$

-continued $$C = \frac{1}{3mS} \sum_{i=1}^{m} S_i(v_{i0}v_{i0}^T + v_{i1}v_{i1}^T + v_{i2}v_{i2}^T) - v_{mean}v_{mean}^T \quad (3)$$

2. Calculate the eigenvectors and corresponding eigenvalues of C: E0, E1 and E2 are the eigenvectors (e.g. sorted in increasing order of eigenvalues).
3. Translate vertices by $-v_{mean}$. Then the mean point of all vertices will be the origin.
4. Rotate vertices to make E0, E1 and E2 align with X, Y and Z axis.
5. Translate vertices by $v_{mean}$.
6. Compress the rotated geometry data, e.g. by the classical three-step procedure: pre-quantization of vertex positions, prediction of quantized positions, and entropy coding of prediction residuals.
7. Besides the encoded prediction residuals, record E0 and E1 in the compressed component data.

In one embodiment, the following steps are performed during decoding:
1. Decode the prediction residuals, calculate the quantized positions and de-quantize positions.
2. Calculate the mean point $v_{mean}$ (or center) using the de-quantized float positions of each vertex as follows.

$$S = \sum_{i=1}^{m} S_i \quad (4)$$

$$v_{mean} = \frac{1}{3mS} \sum_{i=1}^{m} S_i(v_{i0} + v_{i1} + v_{i2}) \quad (5)$$

3. Translate vertices by $-v_{mean}$.
4. Read the eigenvectors E0 and E1 from the compressed mesh data, and calculate E2=E0*E1
5. Rotate vertices to make X, Y and Z axis align with E0, E1 and E2.
6. Translate vertices by $v_{mean}$.

In other words, the component is translated such that its center moves from its original position to the center of the coordinate system, rotated according to the rotation matrix as defined by the eigenvectors E0,E1,E2 and translated back to its original position.

As both the encoder and decoder only do rigid operation on components, the mean points calculated by the two sides have the same position. The area of a triangle is usually a float number, calculated from the float number positions of its three vertices. Generally, the weight of each vertex of a triangle is calculated from the positions of all the vertices of all the triangles to which it belongs, since these positions define the eccentricity and shape of the component, and thus the importance of the respective vertex. In one embodiment, the area of each triangle is added to the weight of all its three vertices. The weight of a vertex (for calculating the component mean) is the sum of the areas of all its adjacent triangles in this embodiment.

Figure 2:
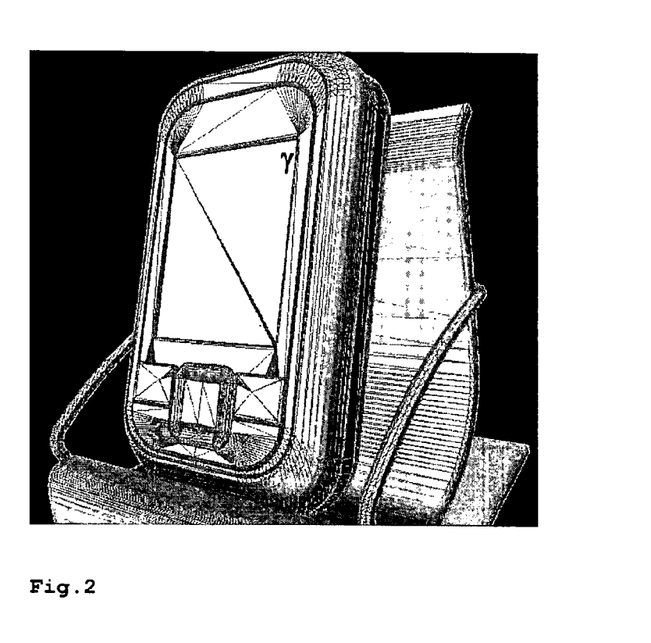
FIG. 2 an exemplary 3D mesh model as a wireframe model.
Figure 3:
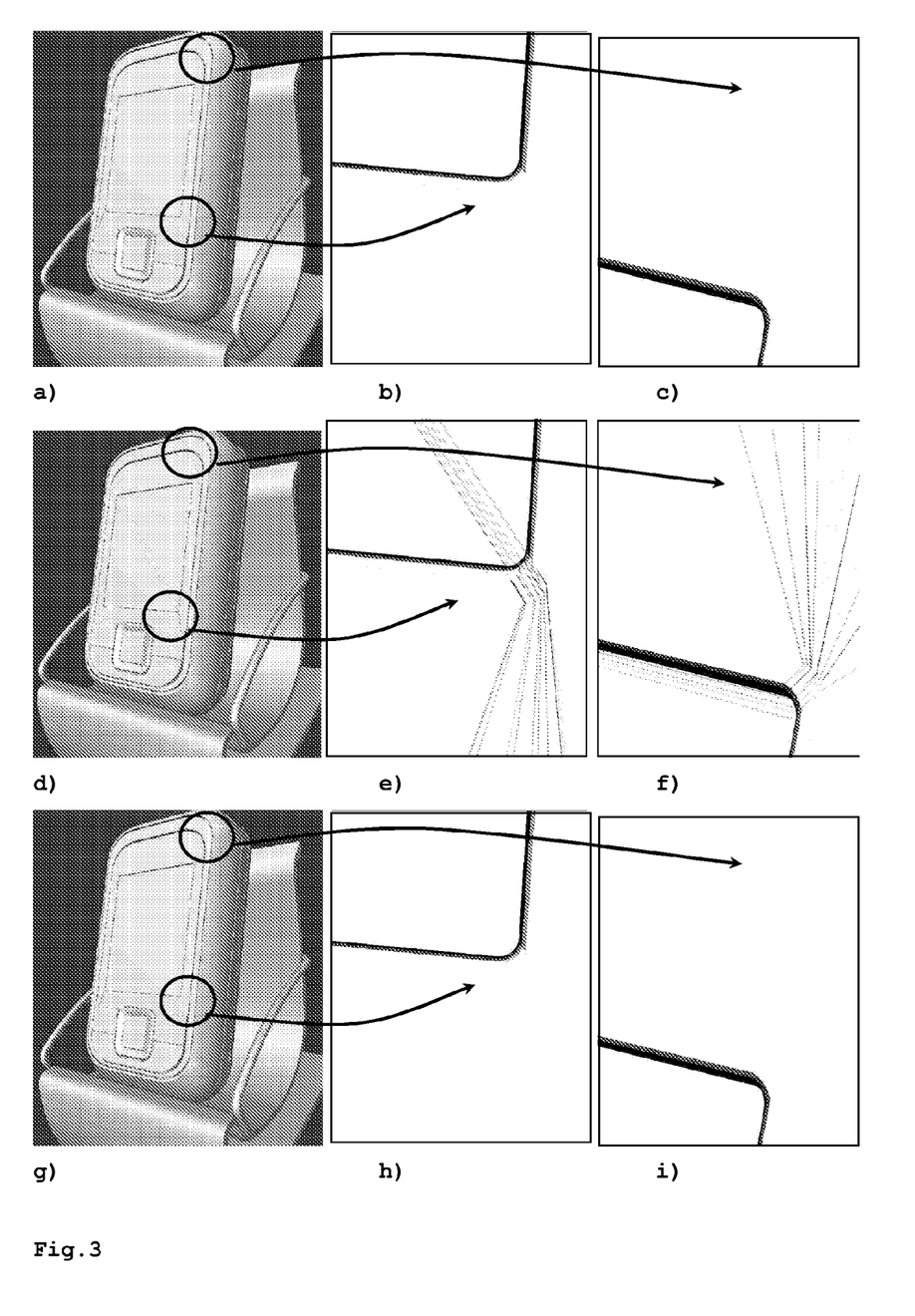

FIG. 2 is an exemplary original 3D model of a personal digital assistant (PDA) located on a seat. The model is made by 3D software[1]. The model is composed of thirteen connected components with totally 12822 vertices and 24696 triangles. FIG. 3 a) shows the same model, with FIGS. 3 b) and c) showing details of edges of a flat front region of the model. Many vertices/triangles are required to define the round corner regions (not visible in FIG. 3 a)-c)). FIG. 3 d) is the same model quantized with 12-bits. There is a significant visual quality loss on the flat surfaces on the quantized model, especially on the area with high vertex density, i.e. the round corner regions. To show the difference clearly, the close-ups of the original and quantized models are shown in FIGS. 3 b),c) and e),f) respectively. While in the original model a)-c) the triangles of the flat region are coplanar, this is not the case after conventional quantization d)-f). However, encoding and decoding according to the present invention yields improved quality of the 3D model, as shown in FIG. 3 g)-i). Compared with the decoded model shown in FIG. 3 a), the geometry compression technique proposed herein significantly improves the quality of the decoded model while using the same quantization resolution.

[1]3DsMax

This invention provides an efficient geometry compression method, especially for 3D meshes with highly non-uniform vertex distribution and large scale flat surfaces that are not orthogonal to any coordinate axes, such as 3D engineering models. Most 3D engineering models have many connected components, which each have a different object space.

A geometry encoder according to one aspect of the invention compresses each connected component in its own object coordinate system, where the large scale feature of the connected component (e.g. flat surfaces) is orthogonal to one of the coordinate axes, and can be much better reserved at conventional or even less quantization resolution. Encoding can be based on prediction and residuals. As the large scale feature has been normalized, the entropy of the residual of a predicted position is also decreased, which helps increase the compression ratio of geometry encoding. Both the quality of the decoded model and the compression ratio can be improved at the same time.

In one embodiment, the encoder first computes an orthonormal basis in 3D-space that describes the eccentricities of a current connected component by a simple and computational efficient technique, which is Principal Component Analysis (PCA) based. This basis is used as a pure rotation matrix to bring the corresponding connected component to a normalized (or canonical) orientation mesh. The rotated geometry data is then quantized, predicted and entropy encoded. The orthonormal basis is also recorded in the compressed mesh data, so that the decoder can restore the original geometry of each connected component and assemble them together after decoding the component geometry.

Figure 4:
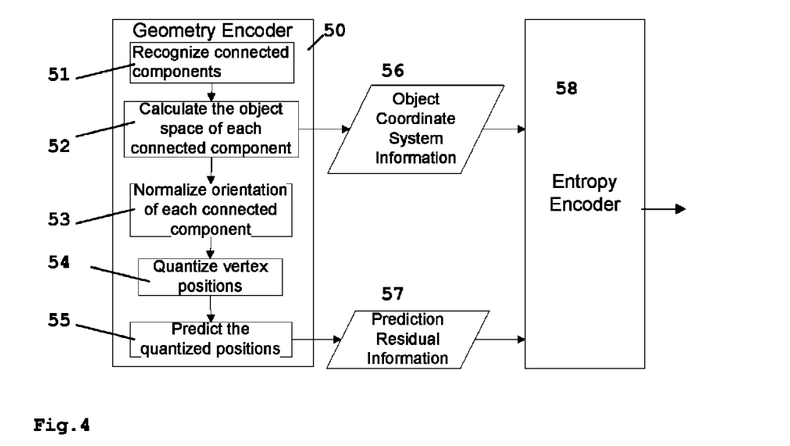
FIG. 4 a block diagram of an entropy encoder for 3D mesh models.

FIG. 4 shows a block diagram of a geometry encoder according to one aspect of the invention. The geometry encoder 50 comprises a component recognition block 51 that recognizes connected components, an object space calculation block 52 that calculates the object space (i.e. the individual orthonormal basis in 3D space) of each connected component, as described above, an orientation normalization block 53, a quantizer 54 for quantizing vertex positions and a differential encoding block 55 for predicting the quantized vertex positions and generating residuals. The object space calculation block 52 outputs object coordinate system information 56, i.e. data defining the calculated object space, to an entropy encoder 58. The differential encoding block 55 outputs the residual information 57 also to the entropy encoder 58.

The entropy encoder 58 generates a signal that represents an entropy encoded 3D model, and that comprises at least one group of encoded vertex data, representing a connected component, and the object coordinate system information relating to said component. The object coordinate system information can be used to define a transformation between a component coordinate system (CCS) and the world coordinate system (WCS).

Figure 5:
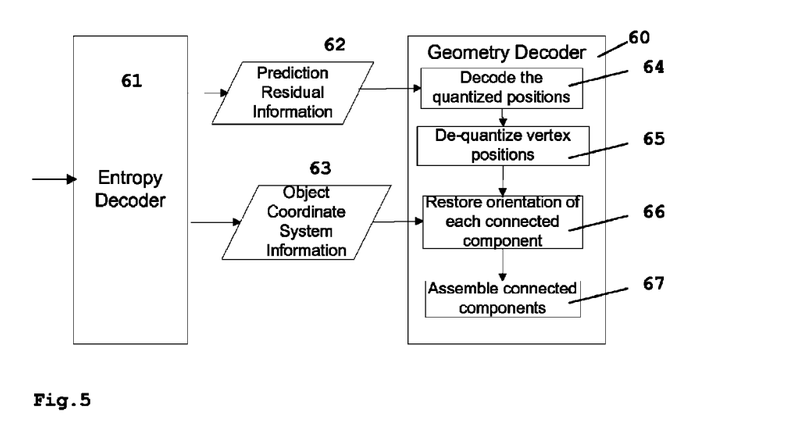
FIG. 5 a block diagram of an entropy decoder for 3D mesh models.

FIG. 5 shows a block diagram of a corresponding geometry decoder according to one aspect of the invention, which is suitable for decoding the above-described signal that represents an entropy encoded 3D model. The geometry decoder 60 has an entropy decoder 61, which decodes an input signal and extracts prediction residual information 62, i.e. the actual vertex and connectivity data, and the object coordinate system information 63. In the geometry decoder comprises a decoder 64 for decoding the quantized vertex positions, a de-quantizer 65 for de-quantizing the vertex positions, an orientation restoration block 66 for restoring the orientation of each connected component, and an assemble block 67 for assembling the connected component, and for assembling the 3D model from the connected components. The orientation restoration block 66 receives and processes the object coordinate system information 63, so as to obtain a transform matrix (e.g. rotation matrix). In one embodiment, the processing comprises calculating an eigenvector E2 that is orthogonal to two received eigenvectors E0,E1, as described above.

Figure 6:
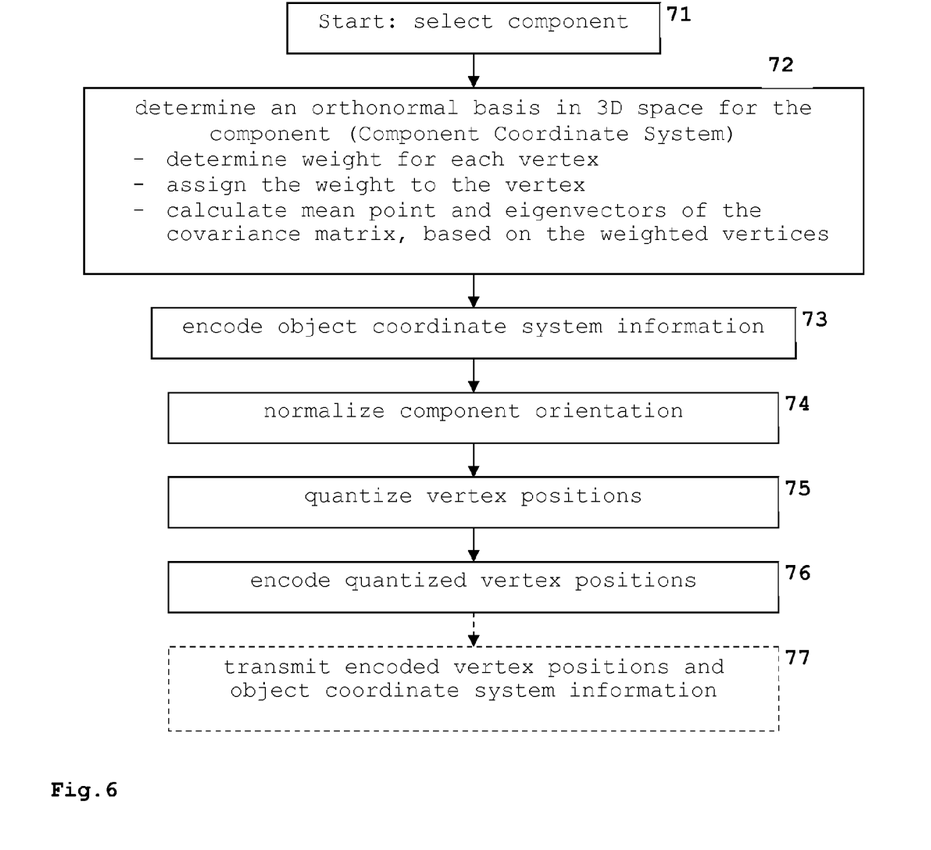
FIG. 6 a flow chart of a method for encoding 3D mesh models.

FIG. 6 shows a flow-chart of an exemplary encoding process. First a component is selected or determined 71, which may happen implicitly. Then, an orthonormal basis in 3D space is determined for the component 72. While the object coordinate system information is used to normalize the object orientation 74, it is also encoded 73. Then the vertex positions are quantized 75 and encoded 76. Finally, the encoded quantized vertex positions and the encoded object coordinate system information may be transmitted 77, stored etc.

The invention is advantageous to minimize the visual artifacts of the quantized 3D mesh models. It is especially good for those 3D meshes with large scale flat surfaces that are not orthogonal to any coordinate axe and yield a highly non-uniform vertex distribution, e.g. 3D engineering models, without sacrificing the simplicity and compression ratio of geometry encoder/decoder. The invention provides an efficient geometry compression strategy designed especially for models with large scale flat surfaces and highly non-uniform vertex distribution.

Another approach for removing the visual artifacts would be to increase the quantization resolution. However, it leads to a significant decrease in the efficiency of the geometry encoder. Therefore it is not used here. Non-uniform quantization needs to divide the mesh into many pieces during encoding and merge the pieces together during decoding which needs much more computation efforts and makes the encoder/decoder more complex. Local coordinate systems depend on the connectivity compression method used and the flat surfaces can not be guaranteed to be orthogonal to any local coordinate axis either.

While it may be generally known to use used PCA based techniques to normalize the orientation of connected components, the present invention uses a weighting scheme for assigning weights to the vertices during computation of the covariance matrix. This kind of weighting scheme is particularly reasonable when considering the dramatically changed triangle size of 3D models made by recent software applications.

In one embodiment, a bit-stream provided by the encoder is similar to a conventional bit-stream, but is only modified at geometry level, i.e. in the header of a group of vertex data of each connected component. The new bit-stream records the object coordinate system information, which includes:
one bit to indicate whether the orientation of the current connected component needs to be normalized. E.g. "1"

means the orientation normalization operation is employed, while "0" means the operation is not employed; and some bits to indicate the coordinate axes of the object coordinate system of the corresponding connected component if the previous bit equals to "1". As each axis is normalized, two floats are enough to record one axis. Two axes are enough to describe the coordinate system. Thus, four floating point values, i.e. 16 bytes, are necessary for the object coordinate system of one connected component.

Exemplarily, a range encoder[2] can be used as entropy coder, which is similar to the arithmetic coder or Huffman coder. The geometry encoder's performance with and without component orientation normalization are listed in Table 1. By using the geometry encoder with component orientation normalization proposed in this invention, we save (1527−1419.6)/1527=7.2% storage, since the prediction residual is also greatly reduced after the connected components become orientation meshes. So the proposed geometry compression not only improves the visual quality of the decoded model at a given quantization resolution, but as another advantage may also increase the compression ratio.

[2] G. N. N. Martin. Range encoding: an algorithm for removing redundancy from digitized message. March 1979, Video & Data Recording Conference, Southampton, UK

TABLE 1

Performance comparison of geometry encoders with and without component orientation normalization when compressing 'PDA' model

| | Geometry encoder without component orientation normalization | | Geometry encoder with component orientation normalization | |
|---|---|---|---|---|
| Org. Geo. (byte) | Comp. Geo. (byte) | Comp. Ratio | Comp. Geo. (byte) | Comp. Ratio |
| 153864 | 1527 | 28.9% | 1207 + 209.6 = 1416.6 | 22.9% |

It should be noted that although triangle areas are used as weighing factors, other types of weighting factors may be constructed from the above-mentioned respective vertex coordinates, as would be apparent to those of ordinary skill in the art, all of which are contemplated within the spirit and scope of the invention.

In one embodiment, a geometry encoder for encoding a 3D mesh model, wherein the 3D mesh model comprises one or more components, comprises determining means (52) for determining an orthonormal basis in 3D space for each of the one or more components, wherein Principal Component Analysis based on the vertices of a component is used and wherein each vertex belongs to one or more triangles, and wherein, for said Principal Component Analysis, each vertex of the component is assigned a weight which is determined from the areas of the triangles to which the vertex belongs, encoder (56) for encoding object coordinate system information of the component, normalizer means (53) for normalizing the orientation of each of the one or more components relative to a world coordinate system (WCS), wherein a transformation means is comprises that performs for each of said one or more components a transformation that is obtained from the determined orthonormal basis of the component, quantizer (54) for quantizing the normalized vertex positions, and encoder (55,57) for encoding the quantized vertex positions.

In one embodiment of the geometry encoder, the determining means (52) for determining an orthonormal basis comprises calculating means for calculating a component mean for each component, wherein for the calculating said weight of a vertex is the sum of the areas of the triangles to which the vertex belongs.

In one embodiment, a geometry decoder for decoding a 3D mesh model comprising one or more components comprises decoding means (64) for decoding quantized vertex positions; de-quantizing means (65) for de-quantizing the decoded vertex positions;

determining means for determining de-quantized vertices that belong to a component of the one or more components;

receiving means (63) for receiving object coordinate system information that relates to said component, the object coordinate system information defining a transformation between a component coordinate system (CCS) and the world coordinate system (WCS); and restoring means (66) for restoring the orientation of said component relative to the world coordinate system (WCS), based on the received object coordinate system information.

In one embodiment, the decoder further comprises assembling means (67) for assembling the 3D mesh model from a plurality of components, wherein for each component individual object coordinate system information is received (63) and for each component the orientation is individually restored (66).

In one embodiment, the restoring means for restoring the orientation of said component comprises calculating means for calculating the mean point of the component using the de-quantized float positions of each vertex of the component, translating means for translating (e.g. shifting) the component, wherein the mean point is translated (e.g. shifted) to the center of the coordinate system, rotating means for rotating the component, and translating means (may be the same as above) for translating the rotated component, wherein the mean point is translated to its former position.

In one embodiment of the decoder, the receiving means performs steps of extracting two eigenvectors E0,E1 of a covariance matrix, calculating a third eigenvector E2 and using the eigenvectors as object coordinate system information for determining an orthonormal basis in 3D space for the component.

While there has been shown, described, and pointed out fundamental novel features of the present invention as applied to preferred embodiments thereof, it will be understood that various omissions and substitutions and changes in the encoding/decoding apparatus and methods described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention, as long as the described advantageous effects are achieved. Each feature disclosed in the description and (where appropriate) the claims and drawings may be provided independently or in any appropriate combination. Features may, where appropriate be implemented in hardware, soft-

The invention claimed is:

1. A computer-implemented method for encoding a 3D mesh model, wherein the 3D mesh model comprises one or more components, the method being executed by a computer and comprising:
   determining an orthonormal basis in 3D space for each of the one or more components, wherein Principal Component Analysis based on the vertices of a component is used and wherein each vertex belongs to one or more triangles, and wherein, for said Principal Component Analysis, each vertex of the component is assigned a weight which is determined from the areas of the triangles to which the vertex belongs;
   encoding object coordinate system information of the component using a hardware encoder;
   normalizing the orientation of each of the one or more components relative to a world coordinate system, wherein for each of said one or more components a transformation is used that is obtained from the determined orthonormal basis of the component;
   quantizing the normalized vertex positions; and
   encoding the quantized vertex positions.

2. The method according to claim 1, wherein the determining an orthonormal basis further comprises calculating a component mean for each component, wherein for the calculating said weight of a vertex is the sum of the areas of the triangles to which the vertex belongs.

3. The method according to claim 1, wherein the quantized vertex positions are differentially encoded based on a spanning triangle, wherein a local coordinate system is used.

4. The method according to claim 1, wherein said transformation is a transformation between a component coordinate system and a world coordinate system, and wherein the object coordinate system information defines said transformation.

5. The method according to claim 1, wherein the object coordinate system information comprises two eigenvectors E0,E1 of the covariance matrix of the component, but not a third eigenvector E2.

6. Geometry encoder for encoding a 3D mesh model, the 3D mesh model comprising one or more components, the geometry encoder comprising a processor and a memory for storing software instructions that when executed on the processor implement
   a determining module for determining an orthonormal basis in 3D space for each of the one or more components, wherein Principal Component Analysis based on the vertices of a component is used and wherein each vertex belongs to one or more triangles, and wherein, for said Principal Component Analysis, each vertex of the component is assigned a weight which is determined from the areas of the triangles to which the vertex belongs;
   an encoder for encoding object coordinate system information of the component;
   a normalizer module for normalizing the orientation of each of the one or more components relative to a world coordinate system, wherein a transformation means is comprises that performs for each of said one or more components a transformation that is obtained from the determined orthonormal basis of the component;
   a quantizer for quantizing the normalized vertex positions; and
   an encoder for encoding the quantized vertex positions.

7. A hardware encoder configured to provide an encoded 3D mesh model that is composed of at least one component, said 3d mesh model comprising:
   at least one group of encoded vertex data, wherein the vertex data in the group belong to the component, and wherein said group of encoded vertex data has a header in the encoded 3D mesh model; and
   object coordinate system information relating to said component, wherein the object coordinate system information defines a transformation between a component coordinate system and a world coordinate system, and wherein said object coordinate system information is stored in said header.

8. The hardware encoder according to claim 7, wherein said object coordinate system information comprises two eigenvectors of the covariance matrix of said vertex data of the component.

9. The geometry encoder according to claim 6, wherein the encoder performs differential encoding of the quantized vertex positions based on a spanning triangle, wherein a local coordinate system is used.

10. A computer-implemented method for decoding a 3D mesh model, wherein the 3D mesh model comprises one or more components, the method being executed by a computer and comprising:
    decoding quantized vertex positions and object coordinate system information from an encoded 3D mesh model using a hardware decoder, wherein the object coordinate system information is stored in a header in the encoded 3d mesh model;
    dequantizing the quantized vertex positions to produce normalized vertex positions;
    restoring an original orientation of each normalized vertex position to produce a plurality of components, wherein for each of said normalized vertex positions a transformation is used that is obtained from the object coordinate system information; and
    assembling a 3D mesh model from the plurality of components.

11. The method according to claim 10, wherein the quantized vertex positions are differentially encoded based on a spanning triangle, wherein a local coordinate system is used.

12. The method according to claim 10, wherein said transformation is a transformation between a world coordinate system and a component coordinate system, and wherein the object coordinate system information defines said transformation.

13. The method according to claim 10, wherein the object coordinate system information comprises two eigenvectors E0,E1 of the covariance matrix of the component, but not a third eigenvector E2.

14. Geometry decoder for decoding a 3D mesh model, the 3D mesh model comprising one or more components, the geometry decoder comprising a processor and a memory for storing software instructions that when executed on the processor implement:
    a decoder configured to decode quantized vertex positions and object coordinate system information from an encoded 3D mesh model, wherein the object coordinate system information is stored in a header in the encoded 3d mesh model;
    a dequantizer configured to dequantize the quantized vertex positions to produce normalized vertex positions;
    an orientation restoration module configured to restore an original orientation of each normalized vertex position to produce a plurality of components, wherein for each of said normalized vertex positions a transformation is used that is obtained from the object coordinate system information; and an assembly module configured to assemble a 3D mesh model from the plurality of components.

* * * * *